(12) United States Patent
Suzuki

(10) Patent No.: US 7,061,658 B2
(45) Date of Patent: Jun. 13, 2006

(54) SCANNING IMAGE FORMATION OPTICAL SYSTEM, OPTICAL SCANNER USING THE OPTICAL SYSTEM, AND IMAGE FORMING APPARATUS USING THE OPTICAL SCANNER

(75) Inventor: Seizo Suzuki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 275 days.

(21) Appl. No.: 10/047,698

(22) Filed: Jan. 18, 2002

(65) Prior Publication Data

US 2002/0131137 A1    Sep. 19, 2002

(30) Foreign Application Priority Data

Jan. 18, 2001  (JP) ............................. 2001-009926

(51) Int. Cl.
    G02B 26/08    (2006.01)
(52) U.S. Cl. .................................... 359/205
(58) Field of Classification Search ............... 359/205, 359/207, 208; 347/259
    See application file for complete search history.

(56) References Cited

U.S. PATENT DOCUMENTS

| 4,726,640 | A | 2/1988 | Iwama et al. |
| 5,017,987 | A | 5/1991 | Nanjoh et al. |
| 5,069,515 | A | 12/1991 | Itami et al. |
| 5,108,843 | A | 4/1992 | Ohtaka et al. |
| 5,304,357 | A | 4/1994 | Sato et al. |
| 5,408,113 | A | 4/1995 | Kanno et al. |
| 5,448,113 | A | 9/1995 | Suzuki et al. |
| 5,453,650 | A | 9/1995 | Hashimoto et al. |
| 5,459,601 | A | 10/1995 | Suzuki et al. |
| 5,508,477 | A | 4/1996 | Kato et al. |
| 5,510,664 | A | 4/1996 | Suzuki et al. |
| 5,546,216 | A | 8/1996 | Suzuki |
| 5,574,591 | A | 11/1996 | Suzuki et al. |
| 5,606,448 | A | 2/1997 | Suzuki et al. |
| 5,612,599 | A | 3/1997 | Itami et al. |
| 5,633,523 | A | 5/1997 | Kato |
| 5,668,413 | A | 9/1997 | Nanjo |
| 5,717,511 | A | 2/1998 | Suzuki |
| 5,726,699 | A | 3/1998 | Itami et al. |
| 5,739,602 | A | 4/1998 | Suzuki et al. |
| 5,769,544 | A | 6/1998 | Suzuki et al. |
| 5,811,353 | A | 9/1998 | Nanjo |

(Continued)

FOREIGN PATENT DOCUMENTS

JP    10-73778    3/1998

(Continued)

Primary Examiner—Euncha P. Cherry
(74) Attorney, Agent, or Firm—Oblon, Spivak, McClelland, Maier & Neustadt, P.C.

(57) ABSTRACT

A scanning image formation optical system for use in an optical scanner for scanning a surface for one or more scanning lines. The optical scanner scans the surface by causing one or more coupled luminous fluxes from a light source to be incident on a deflecting reflective surface of a rotating optical deflector, which rotates around a rotary axis of the optical deflector and is parallel to the deflecting reflective surface. The luminous fluxes are deflected diagonally relative to a surface perpendicular to the rotary axis of the optical deflector, and the deflected luminous fluxes are converged toward the surface by the scanning image formation optical system so as to form an optical spot on the scanned surface. The scanning image forming optical system includes two or more special tilt surfaces, each formed such that a tilt amount of a sub-scanning cross-sectional configuration changes in a main scanning direction.

10 Claims, 9 Drawing Sheets

U.S. PATENT DOCUMENTS

| | | | |
|---|---|---|---|
| 5,875,051 | A | 2/1999 | Suzuki et al. |
| 5,909,966 | A | 6/1999 | Suzuki et al. |
| 5,969,844 | A | 10/1999 | Itami et al. |
| 5,986,791 | A | 11/1999 | Suzuki et al. |
| 5,999,345 | A | 12/1999 | Nakajima et al. |
| 6,069,724 | A | 5/2000 | Hayashi et al. |
| 6,081,386 | A | 6/2000 | Hayashi et al. |
| 6,104,522 | A | 8/2000 | Hayashi et al. |
| 6,141,133 | A | 10/2000 | Suzuki et al. |
| 6,150,698 | A | 11/2000 | Ohtsuka et al. |
| 6,150,779 | A | 11/2000 | Itami et al. |
| 6,166,842 | A | 12/2000 | Aoki et al. |
| 6,185,026 | B1 | 2/2001 | Hayashi et al. |
| 6,188,086 | B1 | 2/2001 | Masuda et al. |
| 6,215,974 | B1 | 4/2001 | Katoh et al. |
| 6,222,662 | B1 | 4/2001 | Suzuki et al. |
| 6,233,081 | B1 | 5/2001 | Suzuki et al. |
| 6,256,133 | B1 | 7/2001 | Suzuki et al. |
| 6,281,609 | B1 | 8/2001 | Itami et al. |
| 6,288,819 | B1 | 9/2001 | Aoki et al. |
| 6,312,108 | B1 | 11/2001 | Kato |
| 6,317,246 | B1 | 11/2001 | Hayashi et al. |
| 6,324,149 | B1 | 11/2001 | Mifune et al. |
| 6,332,669 | B1 | 12/2001 | Kato et al. |
| 6,347,004 | B1 | 2/2002 | Suzuki et al. |
| 6,348,988 | B1 | 2/2002 | Aoki et al. |
| 6,359,717 | B1 | 3/2002 | Suzuki et al. |
| 6,366,384 | B1 | 4/2002 | Aoki et al. |
| 6,367,914 | B1 | 4/2002 | Ohtaka et al. |
| 6,376,837 | B1 | 4/2002 | Itabashi et al. |
| 6,381,057 | B1 | 4/2002 | Itabashi |
| 6,384,949 | B1 | 5/2002 | Suzuki |
| 6,417,509 | B1 | 7/2002 | Atsuumi et al. |
| 6,429,956 | B1 | 8/2002 | Itabashi |
| 6,462,853 | B1 | 10/2002 | Hayashi |
| 6,465,918 | B1 | 10/2002 | Itami et al. |
| 6,469,772 | B1 | 10/2002 | Itabashi |
| 6,498,617 | B1 | 12/2002 | Ishida et al. |

FOREIGN PATENT DOCUMENTS

| | | |
|---|---|---|
| JP | 11-14932 | 1/1999 |
| JP | 11-38348 | 2/1999 |

RMS=0.31982    P-M=1.83666

SCANNING IMAGE FORMATION OPTICAL SYSTEM, OPTICAL SCANNER USING THE OPTICAL SYSTEM, AND IMAGE FORMING APPARATUS USING THE OPTICAL SCANNER

BACKGROUND OF THE INVENTION

1. Field of the Invention

This invention relates to a scanning image formation optical system, an optical scanner, and an image forming apparatus.

2. Description of the Background

An optical scanner is widely known in connection with an image forming apparatus such as, for example, a digital copying machine, an optical printer, and an optical plotter. The optical scanner is generally configured such that a coupled luminous flux from a light source is deflected by an optical deflector such as a polygon mirror, the deflected luminous flux is condensed toward a scanned surface by using a scanning image formation optical system so as to form an optical spot on the scanned surface, and optical scanning is performed on the scanned surface by the optical spot.

When using an optical deflector of a type in which a deflecting reflective surface rotates around a rotary axis parallel to the deflecting reflective surface, such as a polygon mirror, two methods, described below, are well known for causing a coupled luminous flux transmitted from the light source to be incident on the optical deflector.

The first method is to cause the luminous flux to be incident on a plane perpendicular to the rotary axis in a direction almost parallel to the plane (referred to as the "normal incidence method"), and the second method is to cause the luminous flux to be incident on the plane perpendicular to the rotary axis in a direction diagonal to the plane (referred to as the "diagonal incidence method").

The diagonal incidence method has the following advantages and disadvantages in comparison with the normal incidence method. More specifically, when using a polygon mirror as an optical deflector, for example, it is hard to cause a luminous flux from the light source to be directed toward the rotary axis of the polygon mirror in the normal incidence method. It is not impossible to cause the luminous flux to be so directed, but if an attempt is made to secure a required angle of deflection when it is directed toward the rotary axis, each deflecting reflective surface becomes extremely large, and thereby the polygon mirror cannot be downsized. In addition, a large sag may be generated, and the generated sag is asymmetrical relative to the image height.

A large polygon mirror requires high energy for its high-speed rotation and makes a loud whizzing sound when rotated at a high speed, and therefore it is inevitable to have to increase the size of a sound insulating device in the normal incidence method.

Contrary to this, in the diagonal incidence method, it is possible to cause a luminous flux from the light source to be directed toward the rotary axis of the polygon mirror, by which the polygon mirror can be downsized in its diameter and only a little whizzing sound is made when the polygon mirror is rotated at a high speed. Therefore, the method is suitable for a high-speed optical scanner. Because the polygon mirror can be downsized in its diameter, just a little sag may be generated, and the generated sag can be symmetrical with respect to the image height, thereby facilitating correction of the sag.

On the other hand, however, the diagonal incidence method has a problem in that a significant scanning line curvature is present.

As a method of correcting the significant scanning line curve inherent in the diagonal incidence method, a method has been proposed to add a lens having a lens surface in which an inherent tilt of the lens surface in a sub-scanning cross-section is shifted in the main scanning direction, so as to correct a scanning line curve, to a scanning image formation optical system (Japanese Patent Laid-open publication No. 11-14932). Also, a method has been proposed to add a correction reflective surface having a reflective surface in which an inherent tilt of the reflective surface in a sub-scanning cross-section is shifted in the main scanning direction, so as to correct a scanning line curve, to a scanning image formation optical system (Japanese Patent Laid-open Publication No. 11-38348).

Another problem of the diagonal incidence method is in that relatively significant deterioration is easily caused in the wavefront aberration of a scanning image forming optical system by a beam skew at each peripheral image height, i.e., in the vicinity of both ends of a scanning line. An occurrence of wavefront aberration increases a spot diameter of an optical spot at the peripheral image height. Unless the above-described problem is resolved, high-density optical scanning, which has been demanded in recent years, cannot be achieved. In the optical scanner described in the above publications, a large scanning line curve inherent in the diagonal incidence method is corrected very favorably, but correction of deteriorated wavefront aberration is not enough.

As an optical scanner capable of favorably correcting the above-described deterioration of scanning line curvature and wavefront aberration, which is a problem of the diagonal incidence method, an optical scanner has been proposed in which a plurality of rotary asymmetrical lenses are added to a scanning image formation optical system and in which a generating line joining vertices of generated lines of the lens surfaces of these rotary asymmetrical lenses is curved in the sub-scanning direction (Japanese Patent Laid-open Publication No. 10-73778).

The lens having a lens surface in which a generating line joining vertices of generated lines is curved in the sub-scanning direction, as described above, has a curved generating line. Therefore, the width of the lens in the sub-scanning direction has to be increased. Particularly, when the lens surface has a relatively large curvature, an amount of curvature of the generating line for correcting the scanning line curve is increased, thereby requiring the lens width to be considerably increased.

SUMMARY OF THE INVENTION

The present invention has been made in view of the above-described and other problems and addresses the above-discussed and other problems.

Preferred embodiments of the present invention provide a novel scanning image formation optical system capable of effectively correcting a scanning line curvature and deterioration of wavefront aberration in an optical scanner in a diagonal incidence method.

The preferred embodiments of the present invention further provide a novel optical scanner with the scanning image formation optical system and a novel image forming apparatus with the optical scanner.

According to a preferred embodiment of the present invention, a scanning image formation optical system for an optical scanner for scanning a scanned surface for one or more scanning lines is provided. The optical scanner scans the scanned surface by causing one or more coupled luminous fluxes from a light source to be incident on a deflecting reflective surface of a rotating optical deflector rotating the deflecting reflective surface around a rotary axis of the optical defelector, which is parallel to the deflecting reflective surface, diagonally relative to a surface perpendicular to the rotary axis of the optical deflector, and by converging the deflected luminous fluxes toward the scanned surface by the scanning image formation optical system so as to form an optical spot on the scanned surface. The scanning image formation optical system includes two or more special tilt surfaces, each formed such that a tilt amount of a sub-scanning cross-sectional configuration changes in a main scanning direction.

The optical deflector is of a type rotating a deflecting reflective surface thereof around a rotary axis of the optical deflector, which is parallel to the deflecting reflective surface. The optical deflector can be a rotary single-sided mirror or a rotary two-sided mirror, but is preferably a type rotating a polygon mirror having three or more deflecting reflective surfaces (a rotary multiple-sided mirror).

One or more luminous fluxes are incident on the optical deflector from the light source side. Therefore, a light source capable of emitting one or more luminous fluxes is used. The one or more luminous fluxes from the light source are coupled by a coupling device to the optical deflector. A light source emitting a single luminous flux can be various types of gas or solid-state lasers, an LED, a semiconductor laser, or the like. When a laser luminous flux emitted from a gas laser or a solid-state laser is caused to be incident on the optical deflector, a beam expander or the like is used to realize a luminous flux diameter or a luminous flux form (a parallel luminous flux, a weak divergent luminous flux, or a weak convergent luminous flux), suitable for the optical deflector. The beam expander functions as the above-described coupling device.

When a semiconductor laser is used as the light source, a known coupling lens is used to couple and to transform a divergent luminous flux from the light source into a parallel luminous flux, a weak divergent luminous flux, or a weak convergent luminous flux.

As a light source capable of emitting two or more luminous fluxes, it is possible to use a semiconductor laser array having two or more semiconductor laser light emitting sources, two or more appropriately combined semiconductor lasers, or a combination of two semiconductor lasers and a beam synthesizing prism. When the light source emits two or more luminous fluxes, respective luminous fluxes may be coupled to the optical deflector by a common coupling device or by different coupling devices.

Thus, one or more luminous fluxes incident on the optical deflector from the light source side are coupled to the optical deflector. The coupled one or more luminous fluxes from the light source are incident on the deflecting reflective surface of the optical deflector diagonally relative to a surface perpendicular to the rotary axis of the optical deflector. In other words, the one or more luminous fluxes are incident on the optical deflector in a diagonal incidence method to be deflected by the optical deflector.

The one or more deflected luminous fluxes deflected by the optical deflector are condensed toward a scanned surface by a common scanning image formation optical system to form an optical spot on the scanned surface. When two or more luminous fluxes are emitted from the light source, two or more spots formed on the scanned surface are separate from each other in the sub-scanning direction.

The scanned surface is substantially a photosensitive surface of a photosensitive medium such as, for example, a photoconductive surface of a photoconductive member. Assuming a travel locus of an optical spot optically scanning the scanned surface to be a straight line as an ideal form, the direction of the straight line is referred to as a main scanning direction. Additionally, a direction corresponding to the main scanning direction at an arbitrary position on an optical path between the light source and the scanned surface is also referred to as the main scanning direction. Furthermore, a direction perpendicular to the main scanning direction on the scanned surface is referred to as a sub-scanning direction. A direction corresponding to the sub-scanning direction at an arbitrary position on the optical path between the light source and the scanned surface is also referred to as the sub-scanning direction.

The special tilt surface is a surface where a tilt amount of a sub-scanning cross-sectional configuration changes in the main scanning direction as described above. The special tilt surface can be a lens surface or a reflective surface of a reflecting mirror.

The sub-scanning cross-section is a planar cross-section where an optical element (which can be a lens or a reflecting mirror), forming a scanning image formation optical system, is cut on a virtual plane perpendicular to the main scanning direction at an arbitrary position in the main scanning direction, and a shape of a lens surface or a reflective surface in the planar cross-section is the above-described sub-scanning cross-sectional configuration.

There are countless sub-scanning cross-sections on the above-described optical element. Among these sub-scanning cross-sections, the description herein is intended only for those including an optical axis (the optical axis in this description is not necessarily an optical axis as in optical science, but an axis to be a reference for specifying a lens surface or a reflective surface), and the sub-scanning cross-section is temporarily referred to as a reference sub-scanning cross-section.

A virtual planar cross-section parallel to the main scanning direction including the optical axis on the reference sub-scanning cross-section is referred to as a main scanning cross-section.

The tilt amount of the sub-scanning cross-sectional configuration is a tilt angle of a tangent of the sub-scanning cross-sectional configuration on the special tilt surface on a virtual line of intersection between the main scanning cross-section and the special tilt surface, when the main scanning cross-section is considered relative to the special tilt surface. Here, the above-described tangent is perpendicular to the main scanning cross-section when the tilt amount is zero.

In the above-described scanning image formation optical system, the two or more special tilt surfaces may be formed so as to correct the curvature of a scanning line and the wavefront aberration on the scanned surface.

Further, the above-described scanning image formation optical system may include two or more optical elements. In this case, at least two of the two or more special tilt surfaces may be formed on different optical elements. Furthermore, each of the two or more optical elements can be a lens. If the scanning image formation optical system is formed only of lenses, one surface of the lens at the optical deflector side can be a special tilt surface and an emitting surface of the lens at the scanned surface side can be a special tilt surface. In this example, the emitting surface of the lens at the optical deflector side can be a special tilt surface.

To favorably correct both the curvature of the scanning line and the wavefront aberration, which are peculiar to the diagonal incidence method, it is effective to use two or more image formation elements and to arrange two or more special tilt surfaces separately from each other on separate image formation elements. In other words, a wavefront aberration or a scanning line curvature that cannot be corrected on a single special tilt surface can be further corrected on another special tilt surface. In this example, if the special tilt surfaces are arranged separately from each other, a distance between the special tilt surfaces can be treated as a degree of freedom in design, thereby facilitating correction of the scanning line curvature and the wavefront aberration. In addition, formation of a special tilt surface on an emitting surface rather than an incident surface of an image formation element facilitates the design.

If the scanning image formation optical system includes two or more optical elements and at least two special tilt surfaces are formed on separate optical elements, the two or more optical elements may have one or more lenses and one or more reflecting mirrors, and in this case, at least one special tilt surface can be formed on the reflecting mirror. Naturally, it is also possible to form the scanning image formation optical system only with reflecting mirrors having two or more reflective surfaces and to form two or more special tilt surfaces as reflective surfaces of the reflecting mirrors.

The scanning image formation optical system described above may be configured as an anamorphic optical system having a geometrically conjugate relation in the sub-scanning direction between the vicinity of the deflecting reflective surface of the optical deflector and the position of the scanned surface. This configuration enables correction of a surface tilt in the optical deflector.

When the scanning image formation optical system is configured as an anamorphic optical system, a shape in the main scanning cross-section of one or more lens surfaces of the anamorphic optical system can be non-arcuate. The non-arcuate configuration in the main scanning cross-section enables favorable settings of field curvature, fθ characteristic, linearity, and other characteristics in the main scanning direction. Further, it is possible to cause a center of paraxial curvature in the sub-scanning cross-section on one or more lens surfaces of the anamorphic optical system to curve in the main scanning direction. This means that the power on the lens surfaces in the sub-scanning cross-section can be appropriately set according to a position in the main scanning direction, thereby enabling a favorable correction of field curvature in the sub-scanning direction.

In the scanning image formation optical system configured as an anamorphic optical system, the shape in the sub-scanning cross-section of one or more lens surfaces of the anamorphic optical system can be non-arcuate. This enables a favorable correction of field curvature or wavefront aberration in the sub-scanning direction. Naturally, the lens surfaces may include those having an arcuate shape in the sub-scanning cross-section, or all of the lens surfaces can be either arcuate or non-arcuate in shape in the sub-scanning cross-section.

According to another preferred embodiment of the present invention, an optical scanner configured to scan a scanned surface for one or more scanning lines is provided. The optical scanner scans the surface by causing one or more coupled luminous fluxes from a light source to be incident on a deflecting reflective surface of a rotating optical deflector rotating the deflecting reflective surface around a rotary axis of the optical deflector, which is parallel to the deflecting reflective surface, diagonally relative to a surface perpendicular to the rotary axis of the optical deflector, and by converging the deflected luminous fluxes toward the scanned surface by a scanning image formation optical system so as to form an optical spot on the scanned surface. The scanning image formation optical system may have any of the features described above.

Further, in the optical scanner, the one or more luminous fluxes incident on the deflecting reflective surface of the optical deflector from the light source may be formed into a line image that is long in the main scanning direction in the vicinity of the deflecting reflective surface. In this case, the scanning image formation optical system may be an anamorphic optical system having a geometrically conjucate relation in the sub-scanning direction between the vicinity of the deflecting reflective surface of the optical deflector and the position of the scanned surface.

The optical scanner described above can be a single-beam optical scanner wherein a single luminous flux is incident on the deflecting reflective surface of the optical deflector from the light source side to scan a scanned surface with the single luminous flux (single-beam), or can be a multi-beam optical scanner wherein a plurality of luminous fluxes are incident on the deflecting reflective surface of the optical deflector from the light source side to scan the scanned surface with the plurality of luminous fluxes (multi-beam).

If the optical scanner described above is a multi-beam optical scanner configured such that the one or more luminous fluxes incident on the deflecting reflective surface of the optical deflector from the light source side are formed into a line image long in the main scanning direction in the vicinity of the deflecting reflective surface, and if the scanning image formation optical system is configured as an anamorphic optical system having a geometrically conjugate relation in the sub-scanning direction between the vicinity of the deflecting reflective surface of the optical deflector and the position of the scanned surface, preferably the anamorphic optical system may satisfy the following condition:

$$0.9 < |\beta_h/\beta_0| < 1.1, \qquad (1)$$

where $\beta_0$ is a lateral magnification in the sub-scanning direction to the image height 0 and $\beta_h$ is a lateral magnification at an arbitrary image height h.

In general, if a position of a principal point of the scanning image formation optical system shifts closer to the peripheral image height from the center, the previous and following positions of the principal point are varied by using two or more surfaces in which paraxial curvature in the sub-scanning cross-section varies in the main scanning direction, thereby keeping the magnification at each image height almost constant to obtain an optical spot having a stable spot diameter.

If the above condition (1) is satisfied, the lateral magnification among respective image heights is kept almost constant, thereby enabling the scanning line intervals on the scanned surface optically scanned by multiple beams to be kept almost constant (for example, 21.4 μm for 1,200 dpi contiguous scanning). Therefore, it is possible to achieve a favorable image with reduced deviation in dot position in the sub-scanning direction on the image, and less uneven image density.

In the optical scanner described above, the luminous fluxes from the light source can be directed toward the rotary axis of the optical deflector to be incident on the deflecting reflective surface of the optical deflector. This makes a sag occurring at the image height 0 symmetrical, and further, if a polygon mirror having a deflecting reflective surface is used for the optical deflector, this decreases the diameter of the polygon mirror.

The optical deflector of the above-described optical scanner may preferably be a rotary polygon mirror. In this case, the length in the main scanning direction on the deflecting reflective surface of the optical deflector can be set to a value smaller than that of a luminous flux diameter in the main scanning direction of the luminous flux incident on the deflecting reflective surface from the light source. In other words, the optical scanner is what is called an overfilled optical system in this case.

As a measure for realizing a high-speed writing operation in optical scanning, a method of increasing the number of planes of a polygon mirror is known. While the writing speed increases in proportion to the number of deflecting reflective surfaces of a polygon mirror, increasing the number of planes of the polygon mirror generally causes an increase in the radius of an inscribed circle of the polygon mirror, and therefore it becomes hard for the polygon mirror to rotate at a high speed.

An overfilled optical system is known as a measure for resolving this problem, in which a polygon mirror having a relatively small radius of an inscribed circle is achieved by causing a luminous flux, which is wider in the main scanning direction than each deflecting reflective surface of the polygon mirror, to be incident on the deflecting reflective surface of the polygon mirror so that the deflecting reflective surface is treated as a substantial aperture in the main scanning direction.

With the above-described overfilled optical system, a polygon mirror having a relatively small radius and plenty of planes is realized, thereby reducing influence of wind, enabling high-speed rotation, lowering whizzing sound, and realizing a reduction of a power consumption and high durability of the polygon mirror.

According to another preferred embodiment of the present invention, an image forming apparatus for forming an image by optically scanning a photosensitive medium using an optical scanner is provided. The optical scanner can be any of the above-described optical scanners.

For the photosensitive medium, known various types of mediums can be used. For example, by using a color development photographic paper, which can be colored by heat, as the photosensitive medium, it is possible to form an image by optically scanning the medium with heat energy of an optical spot.

Depending upon a photosensitive medium, it is possible to form an image by forming a latent image on the photosensitive medium by optical scanning and by visualizing the latent image. In this case, a silver haloid film can be used as a photosensitive medium, for example. The latent image formed on the silver haloid film by optical scanning is developed, and the developed image is fixed, according to a silver haloid print process. This type of an image forming apparatus can be realized as an optical plate making machine or an optical plotter.

It is also possible to use a photosensitive member having a photoconductive property as a photosensitive medium. In this case, a latent image is formed as an electrostatic latent image and is visualized as a toner image. The toner image can be borne on a sheet-type recording medium.

When a known zinc oxide photosensitive sheet is used as a photosensitive member having a photoconductive property, a toner image formed on the zinc oxide photosensitive sheet can be directly fixed onto the zinc oxide photosensitive sheet as a sheet-type recording medium.

When a photosensitive member having a photoconductive property, which is repeatedly usable, is used for the photosensitive member, a toner image formed on the photosensitive member is transferred to a transfer sheet, an OHP sheet (a plastic sheet for an overhead projector), or other sheet-type recording mediums, directly or via an intermediate transfer belt or other intermediate transfer mediums, and is then fixed, by which a desired image is obtained.

Each of the above-described image forming apparatuses can be realized as a digital copying machine, an optical printer, an optical plotter, a facsimile, or the like.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Figure 1A:
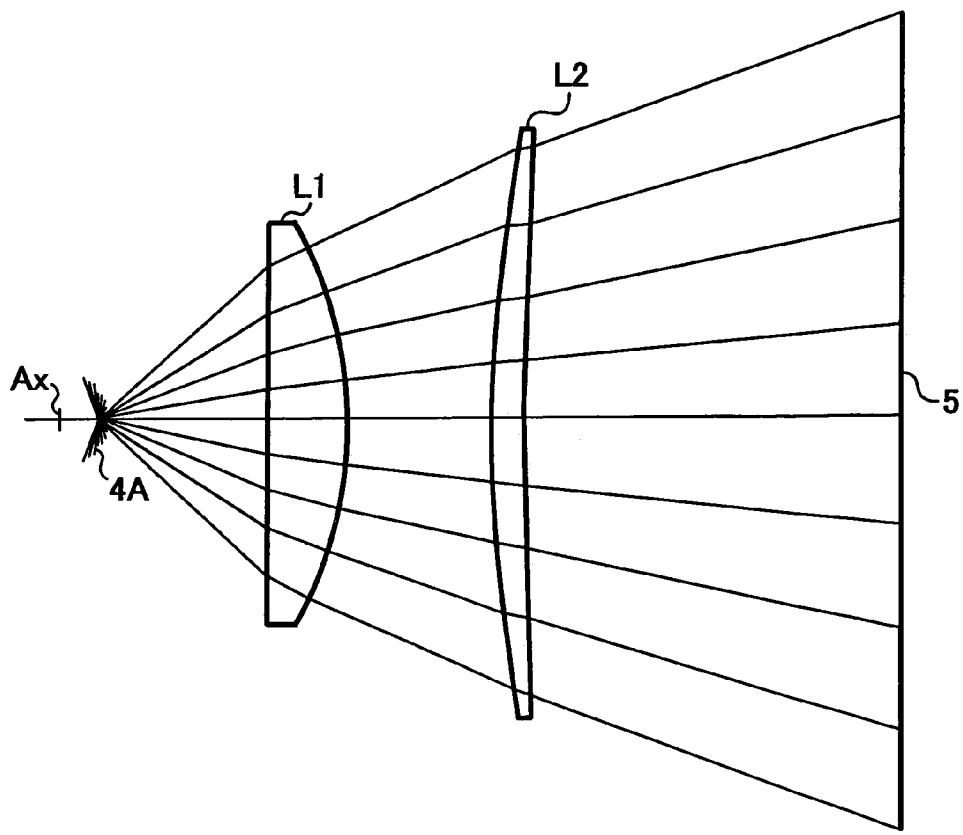
FIGS. 1A and 1B are diagrams for explaining an optical scanner according to an embodiment of the present invention.

Referring now to the drawings, wherein like reference numerals designate identical or corresponding parts throughout the several views, preferred embodiments of the present invention are described.

Figure 1B:
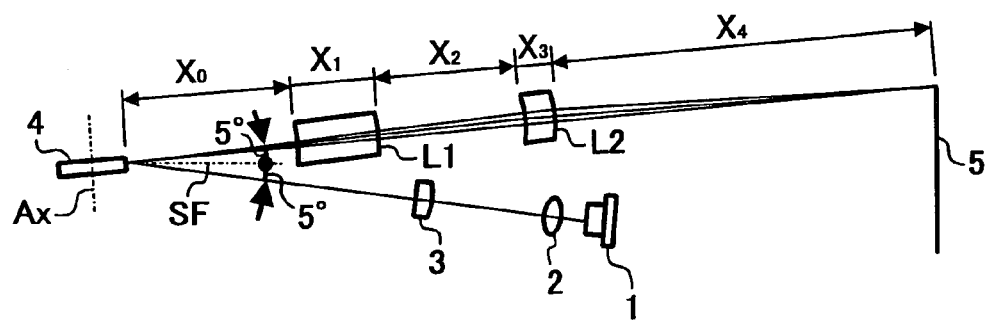

FIGS. 1A and 1B illustrate an exemplary optical arrangement of an optical scanner according to a preferred embodiment of the present invention.

First, referring to FIG. 1B, a divergent luminous flux emitted from a semiconductor laser as a light source designated by reference numeral 1 is transformed into a luminous flux form suitable for a subsequent optical system by a coupling lens 2. The luminous flux transformed into the suitable form by the coupling lens 2 can be a parallel luminous flux, or a weak divergent or weak convergent luminous flux.

The luminous flux from the coupling lens 2 is condensed in the sub-scanning direction by a cylindrical lens 3 and is then incident on a deflecting reflective surface of a rotary polygon mirror (optical deflector) 4. As illustrated in the diagram, the luminous flux from the light source 1 is incident on the deflecting reflective surface of the rotary polygon mirror 4 diagonally relative to a plane SF perpendicular to a rotary axis Ax of the deflecting reflective surface of the polygon mirror 4. Therefore, a luminous flux reflected by the deflecting reflective surface of the polygon mirror 4 is also diagonal to the plane SF.

The luminous flux deflected by the deflecting reflective surface deflects at an equiangular velocity with a constant rotation of the polygon mirror 4 and then reaches a scanned surface 5 through lenses L1 and L2. The lenses L1 and L2 form a scanning image formation optical system to condense the deflected luminous flux toward the scanned surface 5. The deflected luminous flux forms an optical spot on the scanned surface 5, by which optical scanning is performed on the scanned surface 5.

FIG. 1A is a top view of the optical arrangement, showing a positional relation between the lenses L1 and L2 and the scanned surface 5. Reference numeral 4A designates a deflecting reflective surface of the polygon mirror 4. Respective positions of the deflecting reflective surface 4A according to rotation of the polygon mirror 4 and each condition of a main luminous flux of the deflected luminous flux in the respective positions of the deflecting reflective surface 4A are illustrated.

The luminous flux from the light source 1 is directed toward the rotary axis Ax of the polygon mirror 4 so as to be incident on the deflecting reflective surface 4A. Therefore, in FIG. 1A, the central axis of each of the lenses L1 and L2 visually overlaps an optical axis of the luminous flux incident on the deflecting reflective surface 4A.

The scanning image formation optical system formed by the lenses L1 and L2 includes two or more special tilt surfaces, as discussed in further detail below.

Thus, the scanning image formation optical system formed by the lenses L1 and L2 deflects a coupled luminous flux from the light source 1 by causing the luminous flux to be incident on the deflecting reflective surface 4A of the optical deflector 4, of a type that rotates the deflecting reflective surface 4A around the rotary axis Ax, which is parallel to the deflecting reflective surface 4A, diagonally relative to the plane SF perpendicular to the rotary axis Ax. The deflected luminous flux forms an optical spot on the scanned surface 5 by converging the deflected luminous flux toward the scanned surface 5 by the scanning image formation optical system, and scans scanning lines on the scanned surface 5 with the optical spot. The scanning image formation optical system includes two or more special tilt surfaces in which a tilt amount of a sub-scanning cross-sectional configuration changes in the main scanning direction.

The special tilt surfaces formed as two or more lens surfaces of the lens L1 and the lens L2 lens of the scanning image formation optical system are formed so as to correct a scanning line curve and a wavefront aberration on the scanned surface 5.

In addition, the two special tilt surfaces in the scanning image formation optical system are formed on different optical elements, i.e., the lenses L1 and L2, and the optical elements forming the scanning image formation optical system are respectively lenses.

In using two special tilt surfaces, it is possible to apply one of the two special tilt surfaces to one side of the lens L1 located at the optical deflector side and another one of the two special surfaces to an emitting surface of the lens L2 located at the scanned surface side.

In the embodiment in FIG. 1, when applying two special tilt surfaces, the special tilt surfaces can be applied to the emitting surface of the lens L1 and the incident surface of the lens L2. However, from a viewpoint of utilizing a space between the special tilt surfaces as a degree of freedom in design as described above, it is more advantageous to apply the special tilt surfaces to the incident surface of the lens L1 and the emitting surface of the lens L2 because the distance between the special tilt surfaces is longer. From a viewpoint of facilitating the design, however, it is more advantageous to apply the special tilt surfaces to the emitting surfaces of the lens L1 at the optical deflector side and the lens L2 at the scanned surface side.

Figure 2:
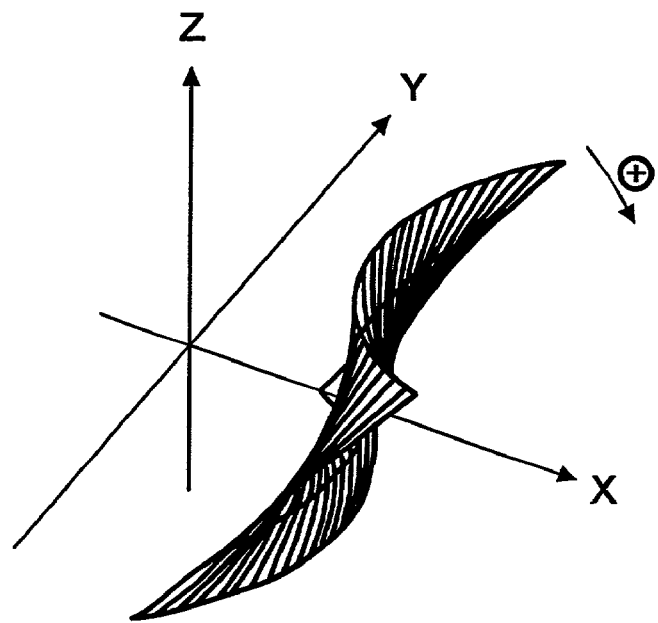
FIG. 2 is a diagram for explaining a special tilt surface, illustrating an example of a variation of a tilt amount of a sub-scanning cross-sectional configuration in the main scanning direction on the special tilt surface.

FIG. 2 illustrates an example of a variation of a tilt amount of a sub-scanning cross-sectional configuration in the main scanning direction on the special tilt surface. In FIG. 2, three perpendicular axes labeled X, Y, and Z are shown, where Y indicates the main scanning direction and Z indicates the sub-scanning direction.

In the embodiment shown in FIG. 1, in reference to a special tilt surface formed on the lens L1 for example, assuming the optical axis of the lens L1 (a reference axis for specifying a lens surface) to be X-axis, the XY plane in FIG. 2 corresponds to the main scanning cross-section in the lens L1.

FIG. 2 illustrates an example of a variation of a gradient of a tangent of the sub-scanning cross-sectional configuration (a shape of a lens surface in the planar cross-section parallel to the XZ plane) on a virtual line of intersection between the main scanning cross-section and the special tilt surface. Namely, a tilt amount changes in the Y direction (the main scanning direction). Thus, the special tilt surface is a surface (a lens surface in the example described above) in which a tilt amount of the sub-scanning cross-sectional configuration changes in the main scanning direction.

Figure 3:
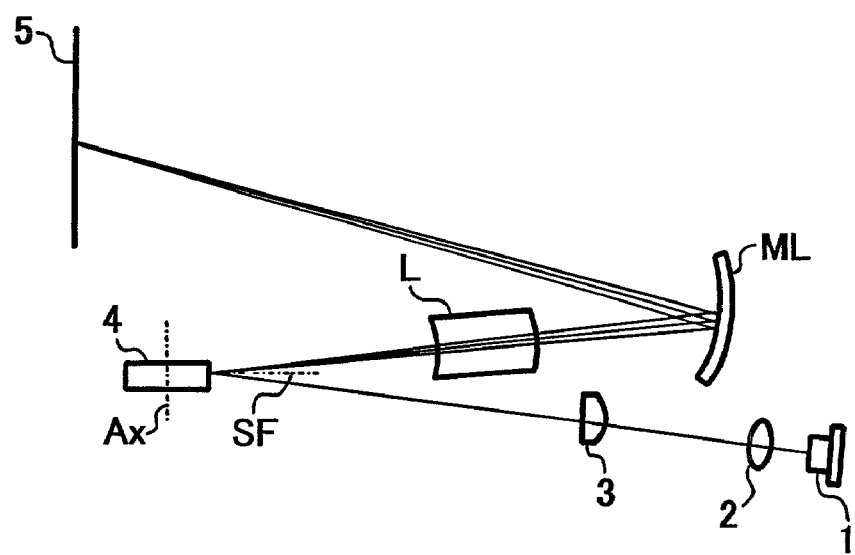
FIG. 3 is a diagram illustrating an optical scanner according to another embodiment of the present invention.

FIG. 3 illustrates an optical scanner according to another embodiment of the present invention. For simplification, the same reference numerals as those in FIGS. 1A and 1B are appended to corresponding parts unless there is any problem of confusion. The optical scanner illustrated in FIG. 3 is almost the same as the one illustrated in FIGS. 1A and 1B except that a scanning image formation optical system in FIG. 3 includes a lens L, and a reflecting mirror ML having an imaging function.

One of two or more special tilt surfaces are formed as a mirror surface of the reflecting mirror ML and others are formed as lens surfaces of the lens L. The special tilt surfaces are formed so as to correct scanning line curvature and wavefront aberration favorably.

In both of the embodiments in FIGS. 1A, 1B, and FIG. 3, a luminous flux from a light source forms an image as a line image that is long in the main scanning direction in the position of a deflecting reflective surface of the polygon 4 by the cylindrical lens 3. Therefore, the scanning image formation optical system in these embodiments is an anamorphic optical system having a geometrically conjugate relation in the sub-scanning direction between the vicinity of a deflecting reflective surface of the optical deflector 4 and the position of the scanned surface 5.

The optical scanner illustrated in FIGS. 1A and 1B or FIG. 3 is an optical scanner for scanning the scanned surface 5 for one or more scanning lines by causing one or more coupled luminous fluxes from the light source 1 to be incident on the deflecting reflective surface 4A of the optical deflector 4, which is of a type that rotates the deflecting reflective surface 4A around the rotary axis Ax thereof parallel to the deflecting reflective surface 4A, diagonally relative to a plane SF perpendicular to the rotary axis Ax, to be deflected. The deflected luminous fluxes are then converged toward the scanned surface 5 by the scanning image formation optical system including the optical elements L1 and L2 (L and ML in FIG. 3) so as to form an optical spot on the scanned surface 5, with the scanning image formation optical system as described above.

In addition, in these optical scanners, one or more luminous fluxes incident on the deflecting reflective surface 4A of the optical deflector 4 from the light source 1 form a line image that is long in the main scanning direction in the vicinity of the deflecting reflective surface 4A, and their scanning image formation optical systems are anamorphic, as described above. In FIGS. 1B and 3, the deflected luminous flux reflected by the polygon mirror 4 is represented by three principal rays. These three principal rays of deflected luminous flux include those generating optical spots at the image height 0, the middle image height, and the most peripheral image height. The condensation of these principal rays at a single point in the position of the scanned surface 5 indicates that a scanning line curve is corrected due to an action of the special tilt surface.

Both of the optical scanners illustrated in FIGS. 1A, 1B, and FIG. 3 according to the above embodiments are single-beam-type optical scanners in which a single luminous flux is incident on a deflecting reflective surface of an optical deflector from a light source. By using a light source section emitting two or more luminous fluxes in the embodiments in FIGS. 1A, 1B, and FIG. 3, however, a multi-beam-type optical scanner is achieved.

As a light source section emitting two or more luminous fluxes, it is possible to use a semiconductor laser array or a light source unit having a system of synthesizing luminous fluxes from a plurality of semiconductor lasers by a beam synthesizing prism.

Figure 4:
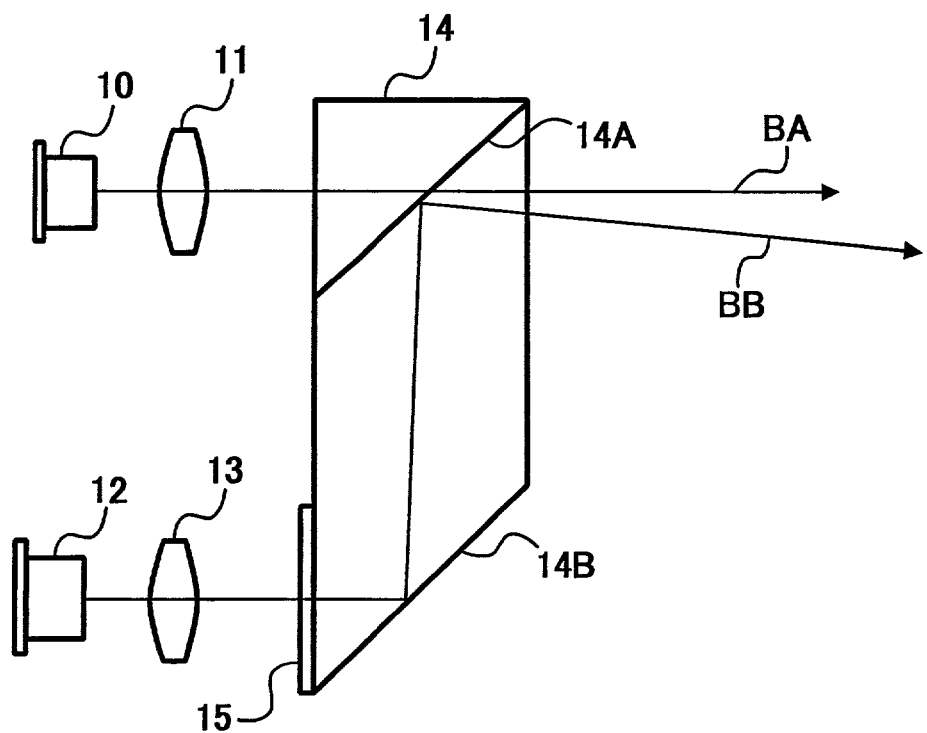
FIG. 4 is a diagram illustrating an example of a light source section using a beam synthesizing prism.

FIG. 4 illustrates an example of a light source section using a beam synthesizing prism.

The light source section includes, as illustrated in FIG. 4, semiconductor lasers 10 and 12, coupling lenses 11 and 13, a beam synthesizing prism 14, and a half-wavelength plate 15.

A luminous flux emitted from the semiconductor laser 10 is coupled with the coupling lens 11. The form of the luminous flux after the coupling can be a substantially parallel luminous flux or a weak divergent or weak convergent luminous flux. The luminous flux is then transmitted through a polarizing separation film 14A of the beam synthesizing prism 14 to be emitted as an optical beam BA. In other words, the semiconductor laser 10 is arranged so that the luminous flux emitted from the semiconductor laser 10 is polarized to a P-polarization relative to the polarizing separation film 14A.

A luminous flux from the semiconductor laser 12 is also emitted as a P-polarization to the polarizing separation film 14A. The luminous flux is coupled with a coupling lens 13 in the same manner as for the luminous flux from the semiconductor laser 10, and is then transmitted through a half-wavelength plate 15, integrally arranged on the synthesizing prism 14, to be turned by 90 degrees on a polarization surface. The luminous flux is incident on the synthesizing prism 14 in the S-polarization condition relative to the polarizing separation film 14A, reflected by a reflective surface 14B, and further reflected by the polarizing separation film 14A to be emitted as an optical beam BB.

A light emitting section of the semiconductor laser 12 is apart from the optical axis of the coupling lens 13 by a very short distance in the diagram, and therefore the optical beam BB emitted from the beam synthesizing prism 14 inclines toward the sub-scanning direction by a minute angle relative to the optical beam BA. Therefore, by causing these two optical beams BB and BA from a light source to be diagonally incident on a deflecting reflective surface of the polygon mirror 4, as described with respect to the embodiment illustrated in FIGS. 1A and 1B or FIG. 3, it becomes possible to obtain two optical spots separated from each other in the sub-scanning direction on the scanned surface 5, thereby enabling multi-beam scanning of two scanning lines at a same time on the scanned surface 5.

In this case, a variation of scanning line intervals can be effectively reduced so as to realize favorable multi-beam scanning by satisfying the following condition (1):

$$0.9 < |\beta_h/\beta_0| < 1.1, \tag{1}$$

where $\beta_0$ is a lateral magnification in the sub-scanning direction at the image height 0 and $\beta_h$ is a lateral magnification at an arbitrary image height h, in an anamorphic scanning image formation optical system.

In the single-beam or multi-beam optical scanners as set forth above, a luminous flux incident on a deflecting reflective surface of the optical deflector 4 is emitted toward the rotary axis Ax of the deflecting reflective surface, and the optical deflector is a rotary polygon (multi-faced) mirror rotating the polygon mirror 4.

Figure 5:
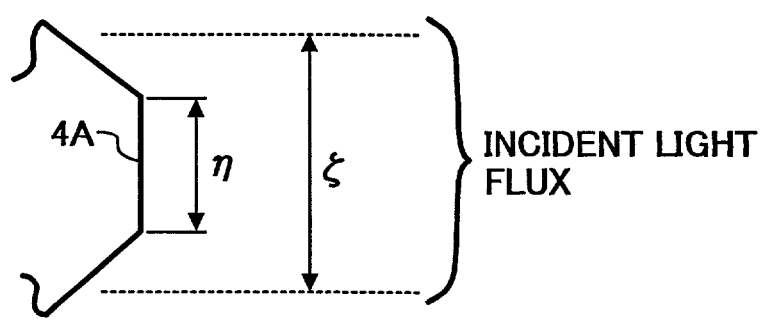
FIG. 5 is diagram for explaining a so-called overfilled optical scanning system, showing a relation between a length of a deflecting reflective surface of an optical deflector in a direction corresponding to the main scanning direction and a diameter of a luminous flux incident on the deflecting reflective surface in the main scanning direction.

In addition, the optical scanners of FIGS. 1A, 1B, and FIG. 3 can be realized as the overfilled optical system set forth above. In other words, the optical scanners of FIGS. 1A, 1B, and 3 can be configured such that a length η of the deflecting reflective surface 4A of the optical deflector 4 in a direction corresponding to the main scanning direction is smaller than a diameter ζ of a luminous flux incident on the deflecting reflective surface 4A in the main scanning direction, as illustrated in FIG. 5.

The above-described configuration causes each deflecting reflective surface 4A to substantially function as an aperture in the main scanning direction, thereby realizing a polygon mirror having a relatively small radius of an inscribed circle. The polygon mirror having a relative small diameter reduces the influence of a wind caused by rotation of the polygon mirror, enabling high-speed rotation of the polygon mirror, and realizing high-speed optical scanning as well as a reduction of power consumption and realizing high durability.

Figure 6:
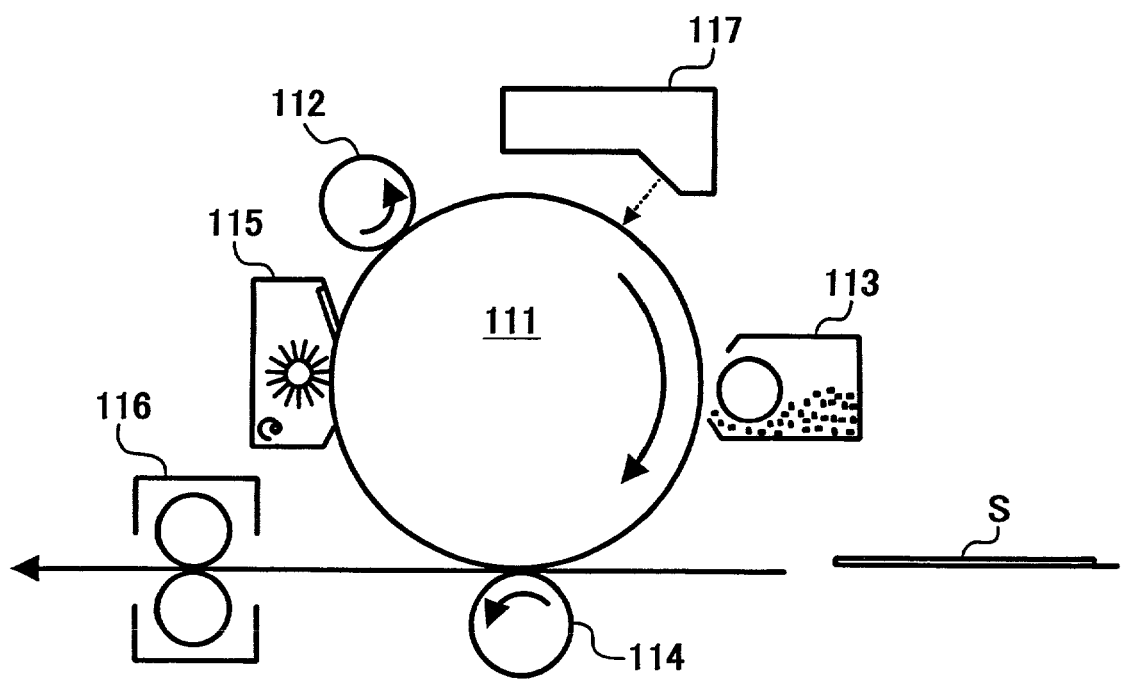
FIG. 6 is a diagram illustrating an image forming apparatus using an optical scanner according to a preferred embodiment of the present invention.

FIG. 6 illustrates an image forming apparatus according to a preferred embodiment of the present invention. The image forming apparatus is an optical printer having a photoconductive photosensitive member 111 cylindrically formed as a photosensitive medium and having a charging roller 112 as a charger, a developing device 113, a transfer roller 114 as a transfer device, and a cleaning device 115 around the photosensitive member. Reference numeral 116 designates a fixing device. A corona charger or a charging brush can also be used for the charging device. A corona charger can also be used for the transfer device.

In addition, the image forming apparatus has an optical scanner 117 configured to perform image writing with optical scanning between the charger 112 and the developing device 113. As the optical scanner 117, those of the FIGS. 1A, 1B, and FIG. 3 can be used.

In an image formation, the photosensitive member 111 is rotated at a uniform velocity in a direction indicated by the arrow, and its surface is uniformly charged by the charger 112. Then, an image is written by optical scanning with the optical scanner 117, thereby forming an electrostatic latent image corresponding to the written image. The formed electrostatic latent image is a so-called negative latent image, exposed in its image part.

The electrostatic latent image is visualized as a toner image by reversal development with the developing device 113. The toner image is transferred to a sheet recording medium S such as a transfer sheet or an OHP sheet by the transfer device 114 and is then fixed by the fixing device 116.

The sheet recording medium S on which the toner image has been fixed is ejected to the outside of the apparatus, and the photosensitive member 111 is cleaned after the toner image transfer by the cleaning device 115 to remove residual toner or paper lint.

Thus, the image forming apparatus of FIG. 6 forms an image by optical scanning on the photosensitive medium 111. Any of the optical scanners described above can be used for the optical scanning on the photosensitive medium 111. A latent image is formed on the photosensitive medium 111 by the optical scanning on the photosensitive medium 111, and the latent image is then visualized. The photosensitive medium 111 is a photoconductive photosensitive member, and the latent image is formed as an electrostatic latent image and is visualized as a toner image. In addition, the toner image is finally borne on the sheet recording medium S.

Hereinafter, a concrete example of the scanning image formation optical systems of FIGS. 1A and 1B and a comparative example are described.

In both of the examples, the semiconductor laser 1 as a light source has a light emission wavelength of 780 nm, and the emitted divergent luminous flux is transformed into a substantially parallel luminous flux by using the coupling lens 2, and forms a line image that is long in the main scanning direction in the position of the deflecting reflective surface 4A of the polygon mirror 4 by the action of the cylindrical lens 3.

The polygon mirror 4 has eight deflecting reflective surfaces and has a radius of an inscribed circle of 15 mm. The luminous flux from the light source 1 is emitted toward the rotary axis Ax of the deflecting reflective surfaces, and an incidence angle on the plane SF perpendicular to the rotary axis Ax is 5 degrees as shown in FIG. 1. The angle of field is within a range of −38 degrees to +38 degrees.

The surface configurations of the lenses L1 and L2 are obtained by a shape equation described below. The present invention, however, is not limited to the equation below, and it is possible to specify a same surface configuration by using another shape equation.

A shape equation $f(Y, Z)$ of a special toroidal surface used in the concrete example is expressed by the following equation (2):

$$f(Y, Z) = fm(Y) + fs(Y, Z), \quad (2)$$

where the first term $fm(Y)$ in the right side represents a shape in the main scanning cross-section and the second term $fs(Y, Z)$ represents a shape in the sub-scanning cross-section on Y-coordinate in the main scanning direction. These $fm(Y)$ and $fs(Y, Z)$ can be represented concretely as described below.

The shape in the main scanning cross-section, $fm(Y)$, is represented as a depth in the optical axis by the following polynomial (3), where Rm is a paraxial radius of curvature in the main scanning cross-section which is a planar cross-section parallel to the main scanning direction including the optical axis (X-axis), Y is a distance in the main scanning direction from the optical axis, Km is the number of conical constants, and Am1, Am2, Am3, Am4, Am5, Am6, and after are coefficients of a higher degree.

$$fm(Y) = (Y^2/Rm)/[1 + \sqrt{1 - (1+Km)(Y/Rm)^2}] + + Am1 \cdot Y + Am2 \cdot Y^2 + Am3 \cdot Y^3 + Am4 \cdot Y^4 + Am5 \cdot Y^5 + Am6 \cdot Y^6 + \cdots \quad (3)$$

In the equation (3), "$Y^3$" represents "Y cubed," for example. It is the same in the following equations.

The shape in the sub-scanning cross-section, $fs(Y, Z)$, is represented by the following equation (4) by using the Y-coordinate in the main scanning direction and the Z-coordinate in the sub-scanning direction.

$$Fs(Y, Z) = (Y^2 \cdot Cs)/[1 + \sqrt{1 - (1+Ks)(Y \cdot Cs)^2}] + \quad (4)$$
$$(F0 + F1 \cdot Y + F2 \cdot Y^2 + F3 \cdot Y^3 + F4 \cdot$$
$$Y^4 + \cdots)Z + (G0 + G1 \cdot Y + G2 \cdot Y^2 +$$
$$G3 \cdot Y^3 + G4 \cdot Y^4 + \cdots)Z^2 + (H0 + H1 \cdot$$
$$Y + H2 \cdot Y^2 + H3 \cdot Y^3 + H4 \cdot Y^4 + \cdots)Z^3 +$$
$$(I0 + I1 \cdot Y + I2 \cdot Y^2 + I3 \cdot Y^3 + I4 \cdot$$
$$Y^4 + \cdots)Z^4 + (J0 + J1 \cdot Y + J2 \cdot Y^2 + J3 \cdot$$
$$Y^3 + J4 \cdot Y^4 + \cdots)Z^5 + \cdots$$

In the first term in the right side of the equation (4), $$Cs = (1/Rs0) + B1 \cdot Y + B2 \cdot Y^2 + B3 \cdot Y^3 + B4 \cdot Y^4 + B5 \cdot Y^5 + \cdots \quad (5)$$

$$Ks = Ks0 + C1 \cdot Y + C2 \cdot Y^2 + 3 \cdot Y^3 + C4 \cdot Y^4 + C5 \cdot Y^5 + \cdots \quad (6)$$

where Cs is a paraxial radius of curvature in the sub-scanning cross-section in the Y-coordinate in the main scanning direction and Ks is a conical constant in the sub-scanning cross-section.

The second term in the right side, $(F0 + F1 \cdot Y + F2 \cdot Y^2 + F3 \cdot Y^3 + F4 \cdot Y^4 + \cdots)Z$, is a part representing a tilt amount. If there is no tilt amount, F0, F1, F2, and after are all 0s.

Unless F1, F2, and after are all 0s, the tilt amount changes in the main scanning direction.

As shown in FIG. 1B, $X_0$ to X4 are associated with plane intervals on the optical path from the deflecting reflective surface of the polygon mirror 4 to the scanned surface, so that they are indicated by X.

| Surface No. | Rm | Rs | X | β | Surface configuration |
|---|---|---|---|---|---|
| 0(Deflecting reflective surface) | ∞ | ∞ | 72.56 | 5 | Plane |
| 1(Lens L1 incidence surface) | 2398.53 | −50.035 | 35.00 | 5 | ST |
| 2(Lens L2 emitting surface) | −141.135 | −200.194 | 61.933 | 5 | STT |
| 3(Lens L1 incident surface) | 441.379 | −85.368 | 14.00 | 5 | ST |
| 4(Lens L2 emitting surface) | 986.169 | −28.909 | 160.556 | 4 | STT | where "ST" is a special toroidal surface and "STT" is a special tilt surface.

In addition, "β" is a tilt angle (degree) relative to the plane SF of each lens surface in the sub-scanning cross-section including a principal ray of a deflected luminous flux when the deflected luminous flux is transmitted toward the image height 0. As indicated above, also on the special tilt surface, β is equal to 5 degrees. This means that the tilt amount on each special toroidal surface is zero in the sub-scanning cross-section including a principal ray of the deflected luminous flux when the principal ray is transmitted toward the image height 0 in the same manner as for the above.

Data for the incident surface (special toric surface) of the lens L1 is as follows:

Rm=2398.530, km=1.8641E+02, Am2=0.0, Am4=8.8272E-09, Am6=−3.5941E-13, Am8=−7.5925E-17, Am10=1.0770E-20,

Rs0=−50.035, B2=2.2545E-06, B4=−1.5173E-10, B6=7.3777E-15, B8=−1.3271E-19, B10=−2.2816E-22, B12=−3.3279E-26.

Data for the emitting surface (special tilt surface) of the lens L1 is as follows:

Rm=−141.135, km=−1.0990E-01, Am2=0.0, Am4=1.8706E-08, Am6=−5.4069E-13, Am8=−5.7626E-17, Am10=1.07380E-20, Am12=1.8819E-25,

Rs0=−200.194, B2=−2.0672E-06, B4=2.1537E-11, B6=2.8426E-14, B8=5.3503E-19, B10=−2.8862E-22, B12=−4.8526E-26.

F2=7.6780E-06, F4=5.5315E-10, F6=−2.3102E-14.

Data for the incident surface (special toric surface) of the lens L2 is as follows:

Rm=441.379, km=−1.2212E+01, Am2=0.0, Am4=−6.2425E-09, Am6=−2.0105E-13, Am8=7.4999E-18, Am10=5.0399E-22, Am12=−1.3469E-26, Am14=−1.8627E-31,

Rs0=−85.368, B2=−1.1903E-07, B4=2.2521E-11, B6=−3.8697E-16, B8=5.7988E-20, B10=3.5272E-24, B12=−1.7642E-28.

Data for the emitting surface (special tilt surface) of the lens L2 is as follows:

Rm=986.169, km=−8.5521E+01, Am2=0.0, Am4=−1.3885E-08, Am6=1.1792E-13,

Am8=1.9594E-17, Am10=−3.3709E-22, Am12=4.2114E-27, Am14=−1.9598E-31,

Rs0=−28.909, B2=4.9121E-07, B4=−1.2701E-11, B6=1.7170E-15, B8=−2.9511E-21, B10=−9.4594E-25, B12=1.2347E-28,

F2=−1.5917E-06, F4=−5.1548E-11, F6=−1.0342E-15.

In the above description of data, "E-11" indicates "10 to the -11th power," for example, and this numerical value is multiplied by the previous numerical value.

Both of the lenses L1 and L2 in this example are made of resin material (e.g., polyolefin resin) having a refractive index of 1.52398, and are manufactured by injection molding. A luminous flux from the light source 1 is emitted toward the rotary axis Ax of the polygon mirror 4 in the diagonal incidence method, by which deflection of a deflected luminous flux is symmetrical with respect to the image height 0. Therefore, the above respective lens surfaces are symmetrical with respect to the X-axis.

FIG. 7A illustrates curvature of field, FIG. 7B illustrates scanning line curvature, and FIG. 7C illustrates fθ characteristic, in the geometrically optical aberration in an optical scanner of FIGS. 1A and 1B with a scanning image formation optical system of the above-described concrete example. As apparent from these diagrams, these characteristics are extremely favorable, and particularly the scanning line curvature is substantially equal to zero.

Figure 8:
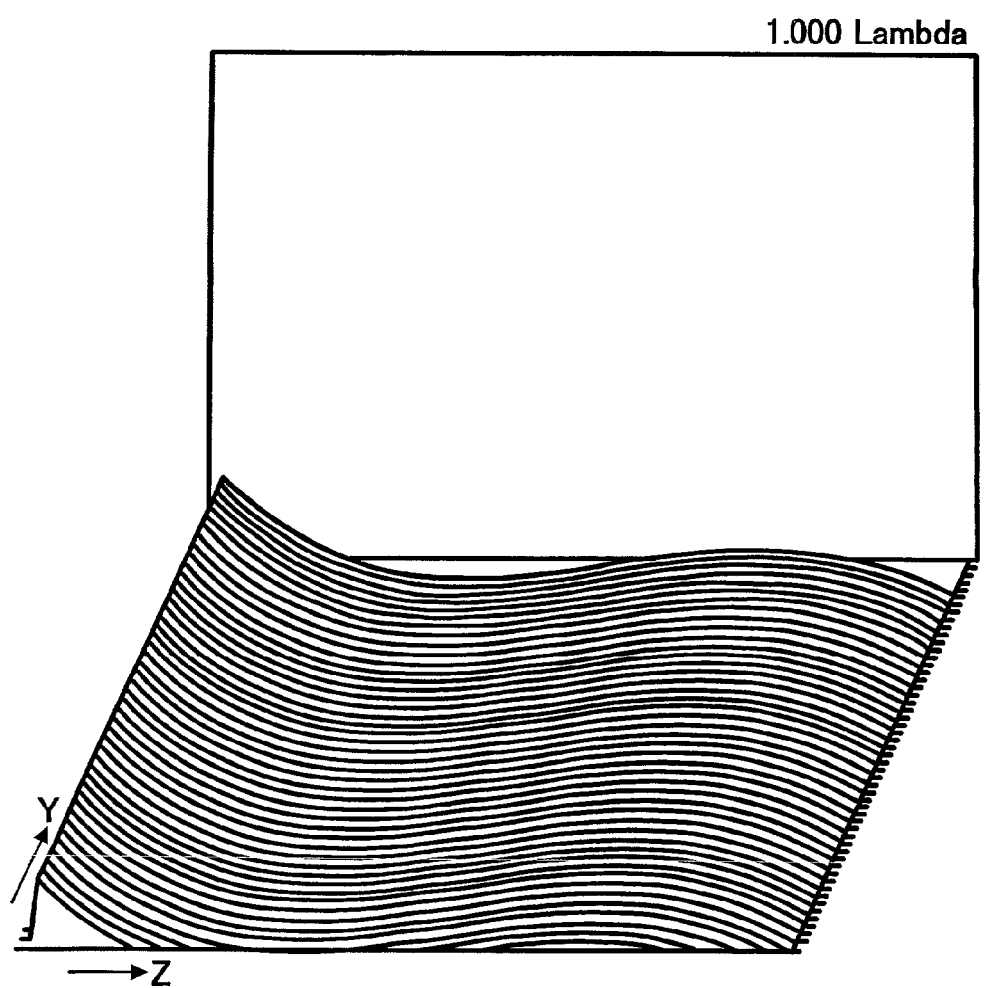
FIG. 8 is a diagram illustrating wavefront aberration of the scanning image formation optical system of the concrete example.

FIG. 8 illustrates with respect to Y- and Z-axes wavefront aberration on a pupil in a position of image height of 157 mm of an optical spot (i.e., the most peripheral portion of the optical spot). From experience, the wavefront aberration on the pupil needs to be reduced to 0.5λ or lower at a PV (peak valley) value. The wavefront aberration in FIG. 8 is 0.29069λ at the PV value, which is sufficiently low.

The wavefront aberration is more favorable as the image height is smaller. As apparent from the fact that a favorable wavefront aberration as illustrated in FIG. 8 is obtained at the most peripheral image height, the wavefront aberration is extremely preferable in the entire scanning area.

Figure 7:
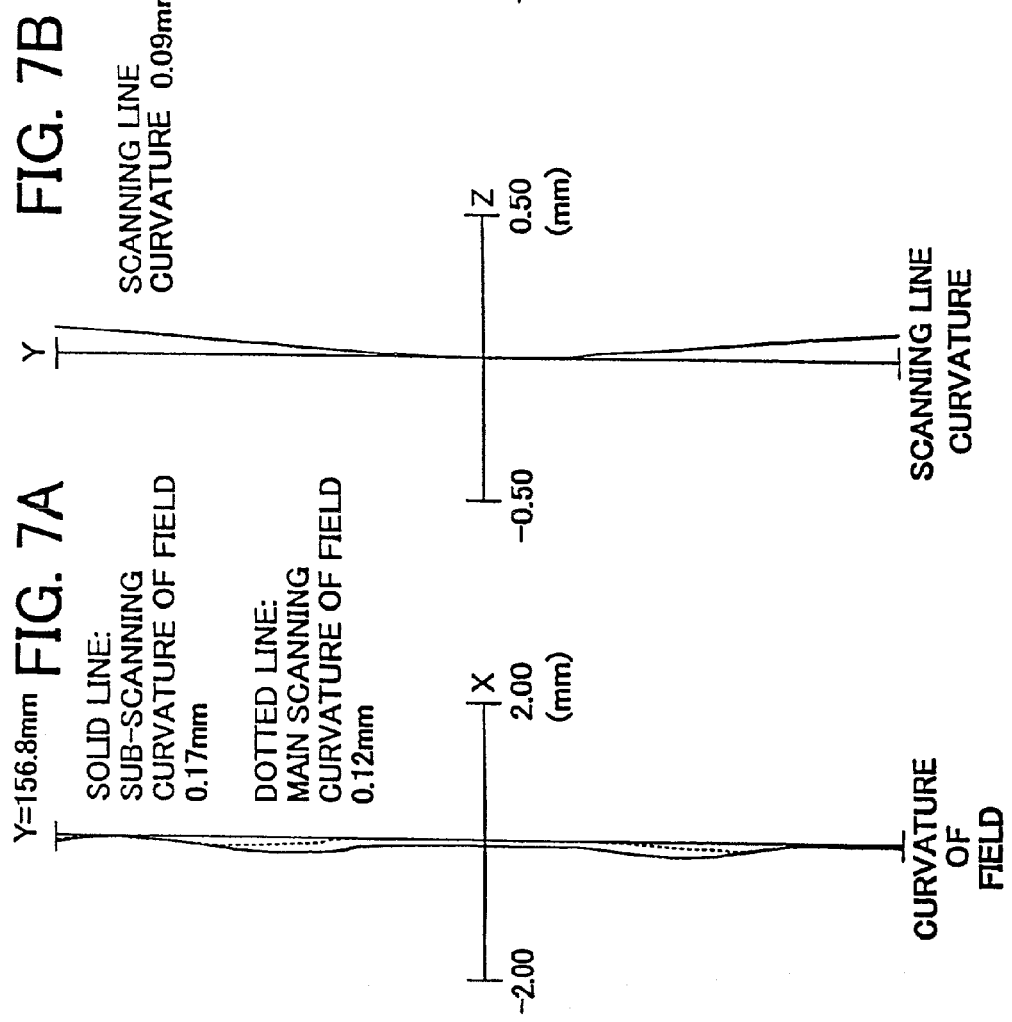
FIGS. 7A, 7B, and 7C are diagrams illustrating field curvature, scanning line curvature, and an fθ characteristic of a scanning image formation optical system of the optical scanner of FIGS. 1A and 1B, according to a concrete example.

Thus, as apparent from FIG. 7 and FIG. 8, the scanning line curve and the wavefront aberration are very favorably corrected in the optical scanner of FIGS. 1A and 1B by using the scanning image formation optical system according to the above-described concrete example.

Figure 9:
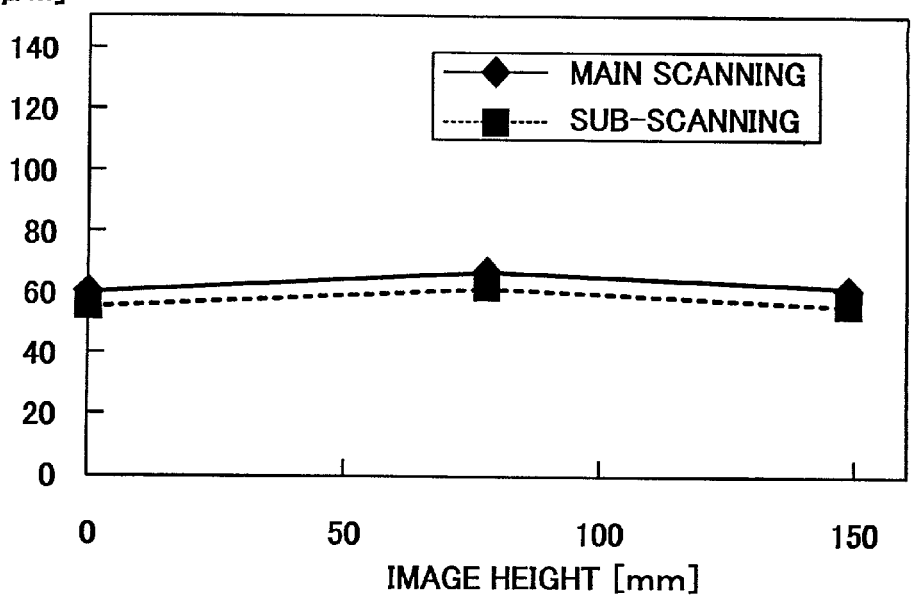
FIG. 9 is a diagram illustrating changes of a spot diameter, in the main scanning direction and in the sub-scanning direction, of an optical spot formed on a scanned surface with the scanning image formation optical system of the concrete example.

FIG. 9 illustrates changes of spot diameter in the main scanning direction and in the sub-scanning direction of an optical spot formed on the scanned surface. As is apparent from FIG. 9, the spot diameter (almost 60 μm both in the main scanning and sub-scanning directions) of the optical spot is very stable in both of the main and sub-scanning directions. This is due to the extremely favorable correction of the wavefront aberration as illustrated in FIG. 8.

Figure 10:
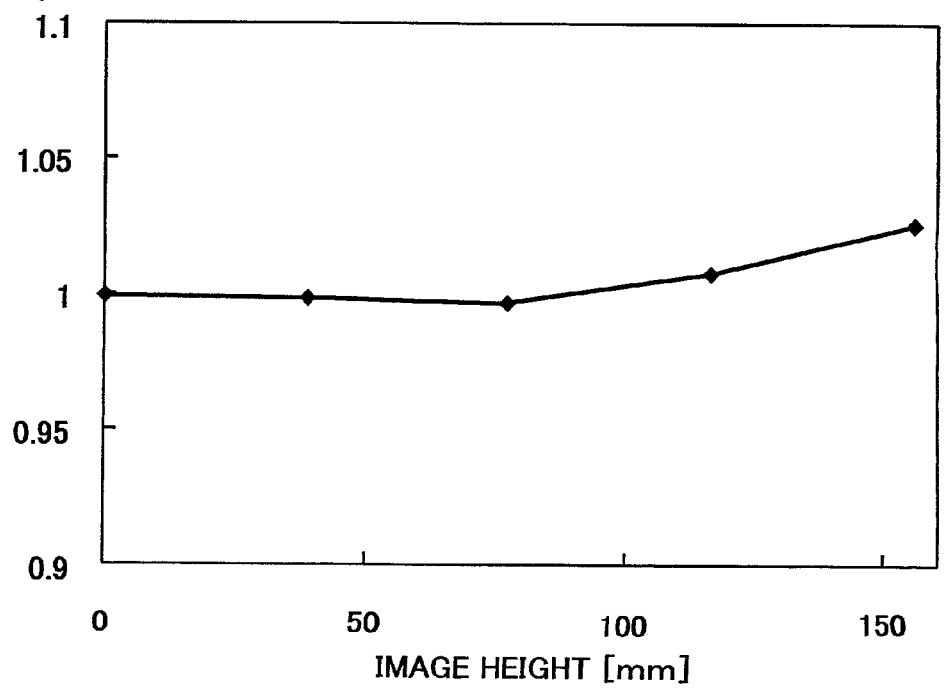
FIG. 10 is a diagram illustrating a change of a magnification ratio, in the sub-scanning direction according to the image height, of the scanning image formation optical system of the concrete example.

FIG. 10 illustrates a change of a magnification ratio $\beta_h/\beta_0$ in the sub-scanning direction, that is a parameter of the condition (1) according to the image height. As apparent from FIG. 10, the scanning image formation optical system according to the above-described concrete example satisfies the condition (1).

A scanning image formation optical system as set forth above and a light source described with reference to FIG. 4 above are used in the optical scanner of FIGS. 1A and 1B, and the optical scanner is configured such that a scanned surface is scanned for two scanning lines simultaneously in multi-beam scanning. In this condition, the scanning line interval is set to 20 μm at the image height 0 and a reference is set to the position of the optical spot at the image height 0 for a single-beam type, so that the optical spots are formed 10 μm apart from each other in both sides of the image height 0.

In this example, curvature of the field, scanning line curvature, curvature fθ characteristic, wavefront aberration, spot diameter variation, and magnification ratio variation of each of the above two optical spots are substantially the same as those in FIG. 7 to FIG. 10. In other words, the scanning image formation optical system of the concrete example can be favorably used also in multi-beam scanning.

A comparative example of a scanning image forming optical system will be given below. The scanning image forming optical system of the comparative example is formed by two lenses (designated by lenses L1 and L2) in the same manner as for the above-described concrete example of a scanning image forming optical system of the present invention, in which a special tilt surface is adopted only for an emitting surface of the lens L2 to correct a geometrically optical aberration. A material of the lenses L1 and L2 is the same as for the lenses L1 and L2 in the concrete example of the present invention.

Data concerning the lenses L1 and L2 in the comparative example is described below in the same manner as for the above-described concrete example of the present invention.

| Surface No. | Rm | Rs | X | β | Surface configuration |
|---|---|---|---|---|---|
| 0(Deflecting reflective surface) | ∞ | ∞ | 72.56 | 5 | Plane |
| 1(Lens L1 incidence surface) | 2152.624 | −50.034 | 35.00 | 5 | ST |
| 2(Lens L2 emitting surface) | −142.908 | −200.194 | 61.933 | 5 | STT |
| 3(Lens L1 incident surface) | 441.379 | −75.269 | 14.00 | 5 | ST |
| 4(Lens L2 emitting surface) | 986.169 | −27.909 | 160.556 | 4 | STT |

Data for the incident surface (special toric surface) of the lens L1 is as follows:
Rm=2152.624, km=2.8896E+02, Am2=0.0, Am4=1.3863E-09, Am6=−2.5313E-13, Am8=−8.1329E-17, Am10=8.1968E-21,
Rs0=−50.034, B2=2.2545E-06, B4=−1.5173E-10, B6=7.3777E-15, B8=−1.3271E-19, B10=−2.2816E-22, B12=−3.3279E-26.

Data for the emitting surface (special toric surface) of the lens L is as follows:
Rm=−142.908, km=−1.5888E-01, Am2=0.0, Am4=2.3617E-08, Am6=7.1842E-14, Am8=−4.0097E-17, Am10=9.8216E-21, Am12=3.5665E-25,
Rs0=−200.194, B2=−2.0672E-06, B4=2.1537E-11, B6=2.8426E-14, B8=5.3503E-19, B10=−2.8862E-22, B12=−4.8526E-26.

Data for the incident surface (special toric surface) of the lens L2 is as follows:
Rm=441.379, km=−1.2212E+01, Am2=0.0, Am4=−6.2425E-09, Am6=−2.0105E-13, Am8=7.4999E-18, Am10=5.0399E-22, Am12=−1.3469E-26, Am14=−1.8627E-31,
Rs0=−75.269, B2=−1.4391E-07, B4=2.1566E-11, B6=−7.9946E-16, B8=3.2452E-20, B10=1.4430E-24, B12=−8.2145E-29.

Data for the emitting surface (special tilt surface) of the lens L2 is as follows:
Rm=986.169, km=−8.5521E+01, Am2=0.0, Am4=−1.3885E-08, Am6=1.1792E-13, Am8=1.9594E-17, Am10=−3.3709E-22, Am12=4.2114E-27, Am14=−1.9598E-31,
Rs0=−27.909, B2=4.6797E-07, B4=−2.2358E-11, B6=−1.4001E-15, B8=−1.2894E-21, B10=−9.5047E-25, B12=3.3258E-29,
F2=−4.7351E-08, F4=−1.4413E-11, F6=−7.0375E-16.

Figure 11:
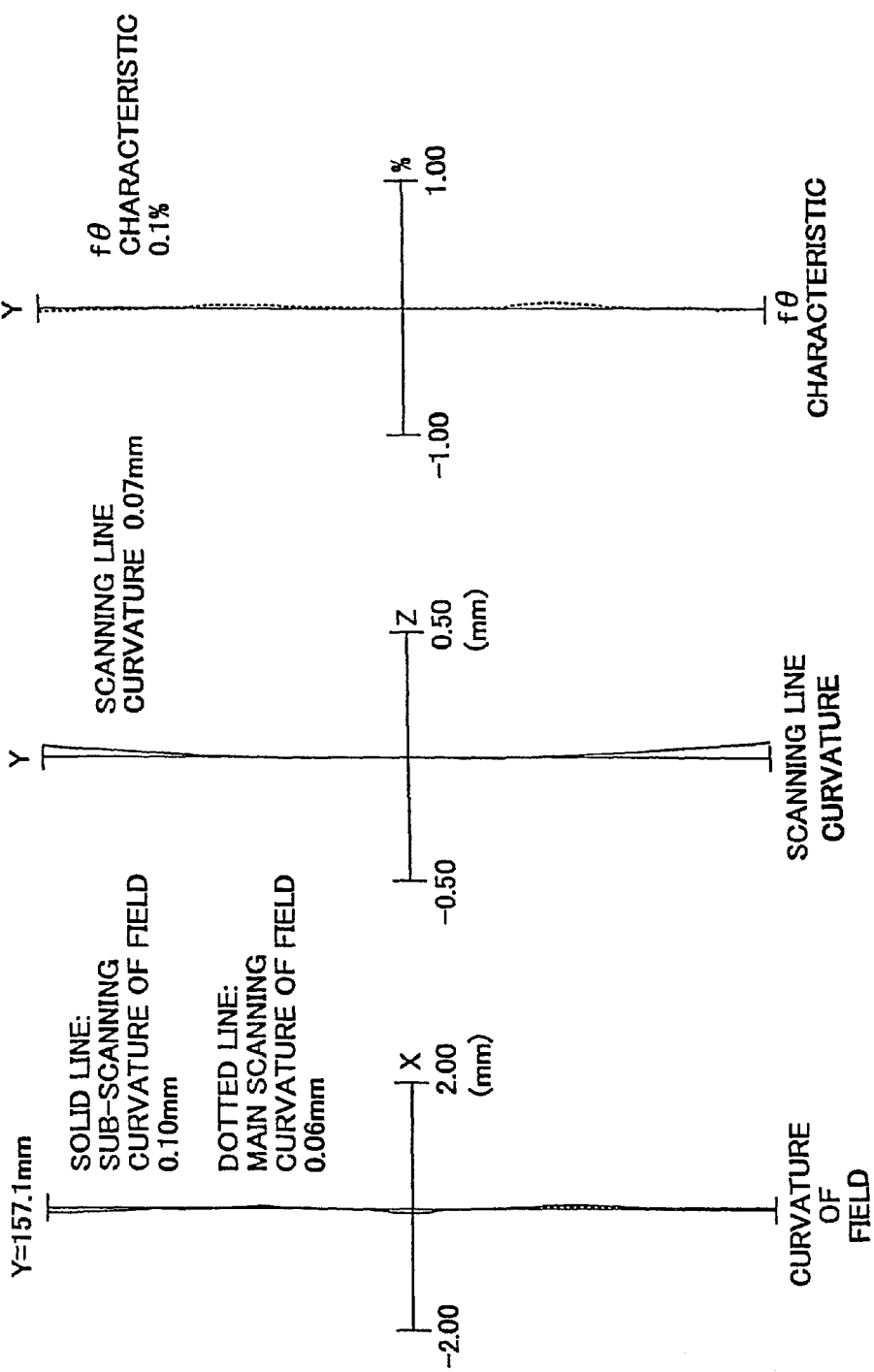
FIGS. 11A, 11B, and 11C are diagrams illustrating a curvature of field, a scanning line curve, and an fθ characteristic of a scanning image formation optical system of the optical scanner of FIGS. 1A and 1B, according to a comparative example.

FIG. 11A illustrates curvature of field, FIG. 11B illustrates scanning line curvature, and FIG. 11 C illustrates fθ characteristic in the geometrically optical aberration in an optical scanner of FIGS. 1A and 1B with the scanning image formation optical system of the above-described comparative example. As is apparent from these diagrams, these characteristics are extremely favorable also in the comparative example, and particularly the scanning line curve is substantially equal to zero as in the concrete example of the present invention.

Figure 12:
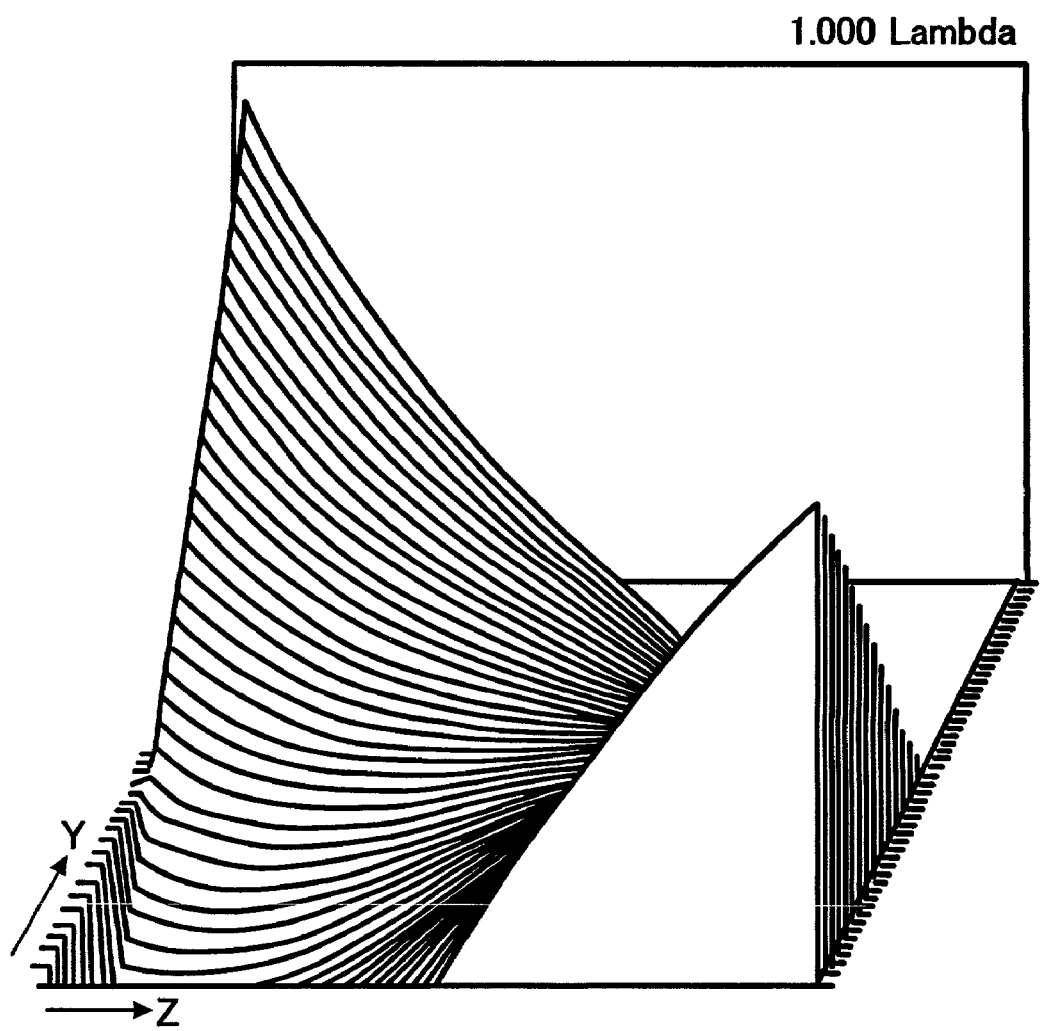
FIG. 12 is a diagram illustrating wavefront aberration of a scanning image formation optical system of the comparative example.

However, as illustrated in FIG. 12, wavefront aberration on a pupil in the position of image height of 157 mm of an optical spot (the most peripheral portion) is significantly inferior to the wavefront aberration of the concrete example of the present invention. As set forth in the above, the wavefront aberration on the pupil needs to be reduced to 0.5 or lower at a PV value. However, the wavefront aberration in FIG. 12 is 1.83666λ at the PV value, which is too high.

In the comparative example, while a somewhat favorable wavefront aberration is obtained in the range of smaller image heights, the wavefront aberration deteriorates rapidly as the image height is increased. Although it is possible to achieve a diameter of an optical spot of approximately 60 μm on the scanned surface in the vicinity of the image height 0 in both of the main scanning and sub-scanning directions, the spot diameter increases together with the image height to about 100 μm at a middle image height and about 180 μm at a peripheral image height. Thus, a stable optical spot is not obtained and the condition (1) is not satisfied.

As described above, it would be understood that not only the scanning line curvature, but also the wavefront aberration can be favorably corrected by using two or more special tilt surfaces as in the scanning image formation optical system according to the present invention.

Numerous additional modifications and variations of the present invention are possible in light of the above teachings. It is therefore to be understood that within the scope of the appended claims, the present invention may be practiced otherwise than as specifically described herein.

The present invention claims priority and contains subject matter related to Japanese Patent Application No. 2001-009926 filed in the Japanese Patent Office on Jan. 18, 2001, and the entire contents of which are hereby incorporated herein by reference.

What is claimed as new and is desired to be secured by Letter Patent of the United States is:

1. A scanning image formation optical system for use in an optical scanner for scanning a scanned surface for one or more scanning lines by causing one or more coupled luminous fluxes from a light source to be incident on a deflecting reflective surface of a rotating optical deflector, which rotates around a rotary axis of the optical deflector, said rotary axis being parallel to the deflecting reflective surface, diagonally deflecting the luminous fluxes relative to a surface perpendicular to the rotary axis of the optical deflector, and converging the deflected luminous fluxes toward the scanned surface by the scanning image formation optical system so as to form an optical spot on the scanned surface, the scanning image forming optical system comprising:

two or more optical elements, at least two different elements of the two or more optical elements each having at least one tilt surface, each said tilt surface formed such that a tilt amount of a sub-scanning cross-sectional configuration changes in a main scanning direction, each tilt surface formed so as to correct a scanning line curvature and a wavefront aberration on the scanned surface, one tilt surface having a different change in a tilt amount in the main scanning direction from another tilt surface, a first tilt surface partially correcting a scanning line curvature and a wavefront aberration, and a last tilt surface further correcting scanning line curvature and reducing a remaining wavefront aberration to a tolerable level.

2. The scanning image formation optical system according to claim 1, wherein each of the two or more optical elements is a lens.

3. The scanning image formation optical system according to claim 1, wherein the two or more optical elements include one or more lenses and a reflecting mirror having one or more reflecting surfaces, and wherein at least one tilt surface is formed on the reflecting mirror.

4. The scanning image formation optical system according to claim 1, wherein the scanning image formation optical system includes two lenses, and wherein said first tilt surface is formed on a surface of a first lens of the two lenses located at a side of the optical deflector and a second tilt surface is formed on an emitting surface of a second lens of the two lenses at a side of the scanned surface.

5. The scanning image formation optical system according to claim 4, wherein the surface of the first lens located at the optical deflector side, in which the first tilt surface is formed, is an emitting surface of the first lens located at the optical deflector side.

6. The scanning image formation optical system according to claim 1, wherein the scanning image formation optical system is an anamorphic optical system having a geometrically conjugate relation in a sub-scanning direction between a vicinity of the deflecting reflective surface of the optical deflector and a position of the scanned surface.

7. The scanning image formation optical system according to claim 6, wherein a shape in a main scanning cross-section of one or more lens surfaces of the anamorphic optical system is non-arcuate.

8. The scanning image formation optical system according to claim 6, wherein a center of paraxial curvature in a sub-scanning cross-section on one or more lens surfaces of the anamorphic optical system draws a curved line in the main scanning direction.

9. The scanning image formation optical system according to claim 6, wherein a shape in a sub-scanning cross-section of one or more lens surfaces of the anamorphic optical system is non-arcuate.

10. The scanning image formation optical system according to claim 1, wherein said tolerable level is a wavefront aberration at a most peripheral portion of said optical spot $0.5\lambda$ or lower at a peak valley value.

* * * * *